(No Model.)
G. LUPPERT.
MACHINE FOR MAKING RAIL PIECES FOR BUREAUS, &c.
No. 259,180.   Patented June 6, 1882.
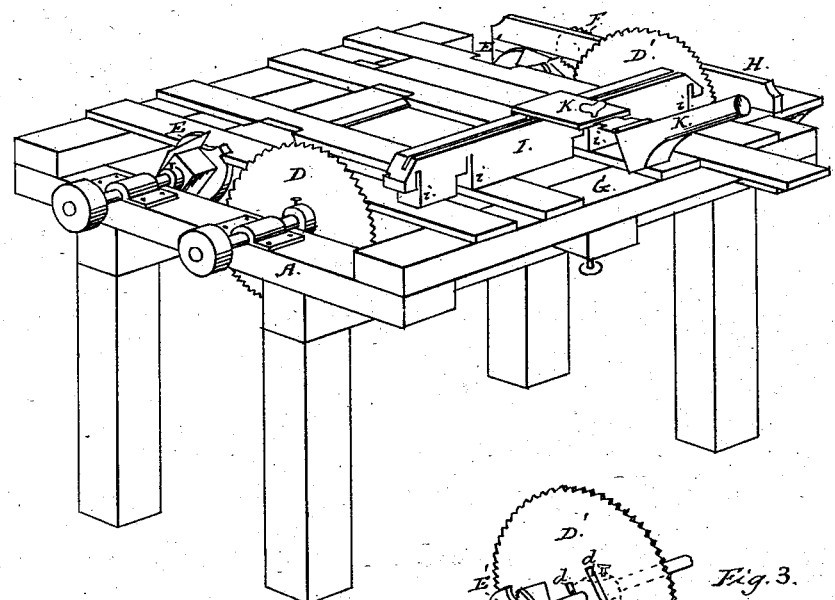
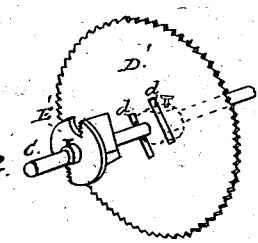
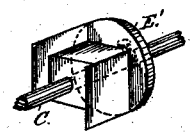
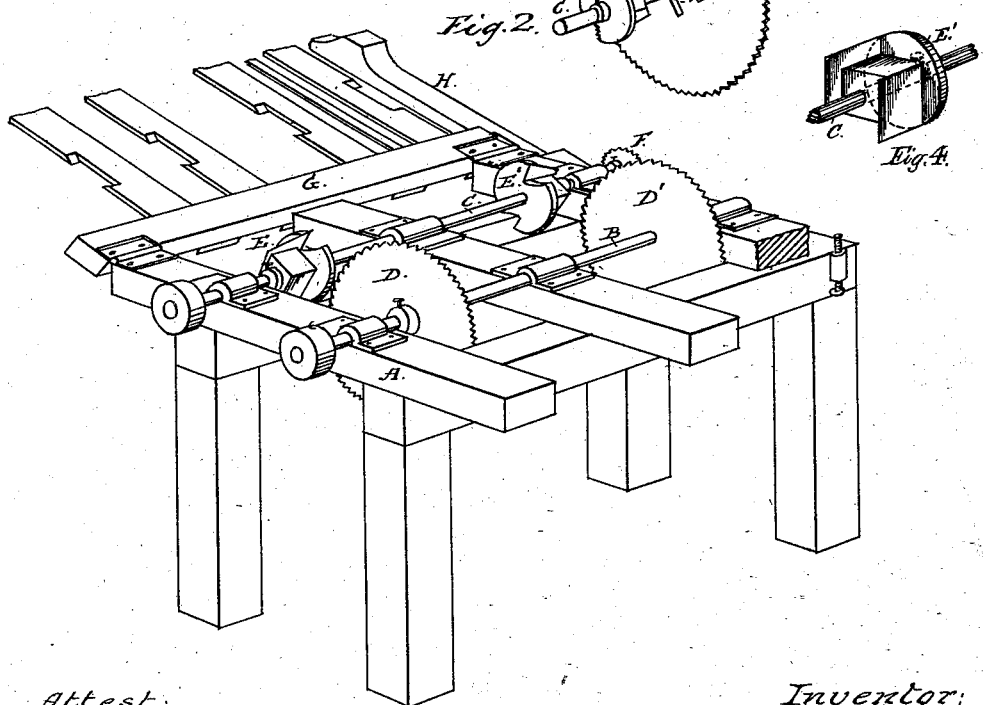
Attest;
F. W. Howard
John C. Schroeder
Inventor;
George Luppert
by Dyer & Wilber
Atty's

United States Patent Office.

GEORGE LUPPERT, OF WILLIAMSPORT, PENNSYLVANIA.

MACHINE FOR MAKING RAIL-PIECES FOR BUREAUS, &c.

SPECIFICATION forming part of Letters Patent No. 259,180, dated June 6, 1882.

Application filed August 27, 1881. (No model.)

*To all whom it may concern:*

Be it known that I, GEORGE LUPPERT, of Williamsport, in the county of Lycoming and State of Pennsylvania, have invented a new and useful Machine for Making Rail-Pieces for Bureaus, Wash-Stands, &c.; and I do hereby declare that the following is a full and exact description of the same, reference being had to the accompanying drawings, and to the letters of reference marked thereon.

The object of this invention is to provide a simple and cheap machine whereby, in the preparation of the rail-pieces used in making the frames of bureaus, wash-stands, and other like articles of manufacture, the combined work of cutting, tenoning, and lock-notching may be accomplished with greater rapidity and with less handling of the material to be fitted than has heretofore been done; and the invention consists in the peculiar construction, arrangement, and combination of the essential and operative parts composing the machine, as will be hereinafter more fully set forth and claimed.

In order that persons skilled in the art may know how to make and use my invention, I will now proceed to describe the same, having reference to the annexed drawings, in which Figure 1 is a perspective view of a machine embodying my invention; Fig. 2, a similar view of the same, with the operative parts more fully shown; and Figs. 3 and 4, perspective views of a modification in the operative parts of the machine.

A represents the frame of the machine, constructed in any suitable manner to support the operative parts thereof.

B and C are mandrels having suitable bearings in frame A at their centers and ends, and being arranged in the same horizontal plane and parallel to one another, as shown.

Upon mandrel B are placed two saws D and D', arranged respectively upon each side of its central bearing, and provided with suitable means for their proper adjustment to any desired point upon the mandrel between its center and end bearings.

Mandrel C carries two cutter-heads, E and E', of ordinary construction, which are arranged thereon in a manner similar to that of the saws upon mandrel B.

Upon the end of mandrel C, opposite to where the driving-power is applied, is arbored the saw F, by means of which the lock-notching of the front rail-pieces is accomplished.

A work-support, G, hinged to the back of the frame of the machine, rests thereon between the saws D D' and cutter-heads E E'; also, a suitable guide, H, secured in a similar manner to the frame, is provided for the lock-notching saw F. Both the work-support and guide should be provided with suitable means at the front of the machine for vertically adjusting them to any desired height, so as to regulate respectively the proper depth of cut of tenons and lock-notch in the rail-pieces. Work-support G should be of a sufficient width to accommodate the largest rail-pieces the machine is capable of cutting and tenoning, and be made open, with strengthening-slats running from front to rear, in order that the saws and cutter-heads can be adjusted to any desired points within the work-support frame without interfering therewith in the fitting of shorter rail-pieces.

A guide, I, arranged transversely upon the work-support, is adapted to be passed along the same, between the saws and cutter-heads, and toward the rear of the machine. It should be of sufficient depth to allow openings $i$ to be made along its length at the proper distances to permit its passing over the saws and cutter-heads when adjusted to any points within the frame.

By means of a clamping device, K, capable of a lengthwise adjustment upon this guide, as well as a lateral adjustment to its front side, any limited number of the rail-pieces may be placed upon the work-support and firmly held at their centers against the guide, and then pushed between the saws and cutter-heads, with which mandrels B C are respectively provided.

The saws D D' should project above work-support G a distance equal to the full thickness of the rail-pieces, and the cutter-heads a sufficient distance to give the necessary depth of cut to form the largest-sized tenons upon the ends thereof.

Motion is imparted to the machine by means of a single belt passing over pulleys provided at the ends of mandrels B C and a counter-shaft arranged beneath the machine.

Its operation is as follows: After the saws and cutter-heads have been properly adjusted upon their respective mandrels to cut the desired length of rail and the desired length and depth of the tenon upon the ends thereof, the rail-pieces, to the number of four or more, are placed upon the work-support, so that they shall be firmly held at their centers between guide I and clamp K. They are then pushed, with the guide and clamp, along by the saws D D' and cut off at both ends, leaving them the necessary length required for the purpose. As soon as the cut rails pass saws D D' they meet the cutter-heads E E', and by being passed along between them are properly tenoned at both ends at the same time. The rail-pieces are then drawn back, with their guide, to the front of the machine, and the lock-notch properly made by passing each rail lengthwise of guide H and the saw F, arranged therein for this purpose. This operation is repeated until all the front rails of one length desired are properly prepared. The machine then can be adjusted to accommodate other desired lengths of the rail-pieces, and the work of preparing them effected in the same manner as before described.

In preparing the back rails, there being no tenons or lock-notch to be cut, it is only necessary to pass them by the saws D D', which cut them into the desired lengths with only one handling of the material.

In Figs. 3 and 4 I have shown a modification whereby the saws and cutter-heads can be carried upon one mandrel and the work of preparing the rail-pieces as satisfactorily performed as by the employment of two mandrels with the saws and cutter-heads arranged thereon separately. In this modification I provide the machine with the mandrel C, which should be located at a point about half-way its width. The mandrel carries the lock-notching saw F, just the same as before described. The cutter-heads E E' are arranged upon the mandrel in an adjustable manner, and the saws D D', provided with slots $d\,d$, cut in their faces, are adjustably arranged upon the same mandrel, between said cutter-heads and the end bearings of the mandrel. By means of the slots $d\,d$ the saws can be adjusted upon the cutter-heads by aid of the two blades of said cutter-heads passing into and through the slots $d\,d$ of the saws, as well as with them, and thus permit the cutting of any desired length of rail with any desired length of tenon by one adjustment only of the cutter-heads and saws accompanying them.

The motive power is applied in the same manner, and the operation of the machine is relatively the same as before described.

Having thus described my invention, what I claim as new is—

In the machine described, the combination, with the cutter-heads E E', adjustable at any point on their mandrel, substantially as described and shown, of the saws D D', provided on each side of their centers with the elongated slots $d\,d$, whereby the said saws may be adjusted on the blades of said cutter-heads, substantially as described, shown, and for the purpose set forth.

This specification signed and witnessed this 20th day of August, 1881.

GEORGE LUPPERT.

Witnesses:
JOSEPH HELMRICH,
THOMAS W. LLOYD.